Patented May 20, 1941

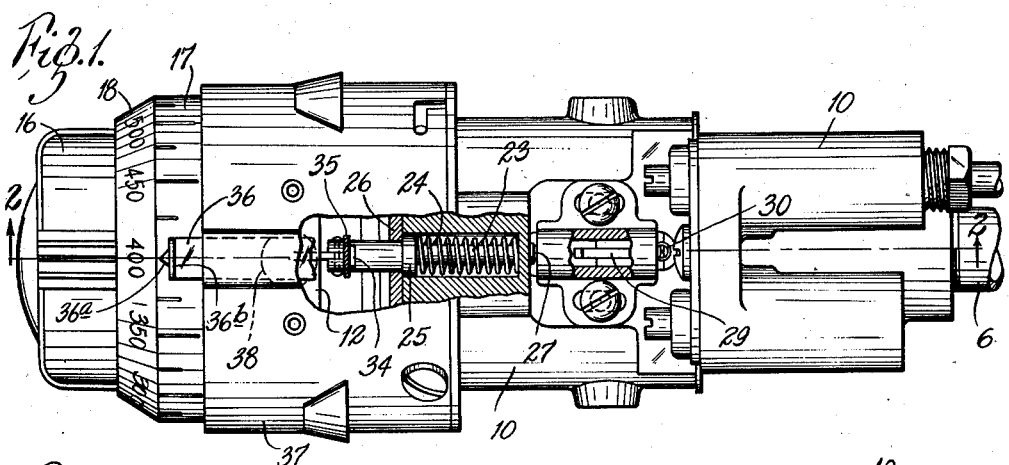

2,242,501

UNITED STATES PATENT OFFICE 2,242,501

TEMPERATURE INDICATOR

Thomas T. Arden, Greensburg, Pa., and Glen M. Cassidy, St. Louis, Mo., assignors to American Thermometer Company, St. Louis, Mo., a corporation of Delaware Application January 23, 1939, Serial No. 252,402

12 Claims. (Cl. 236—94)

Our invention relates to thermostats, particularly those used for controlling the temperature of gas or electrically heated ovens and the like. It has for its object to utilize the thermostatic regulator as a means for setting off an audible alarm and/or operating a visible indicator when the oven temperature reaches the point for which the indicator has been set. The invention consists in the parts and in the arrangements and combinations of parts hereinafter described and claimed.

In the accompanying drawing, wherein like reference numerals refer to like parts wherever they occur, Fig. 1 is a plan view, partly in longitudinal section, of a thermostat embodying our invention, Fig. 2 is a vertical longitudinal section on the line 2—2 in Fig. 1, showing the position of the parts when the audible and visible signals are released, Fig. 3 is a section similar to Fig. 2, showing said signals set for release when the oven temperature reaches the point for which the thermostat has been set; and Fig. 4 is a fragmentary cross-section on the line 4—4 in Fig. 2.

In the accompanying drawing, our invention is shown embodied in a thermostat of the kind used for controlling the temperature of gas heated ovens and the like, but the invention is also applicable to thermostats for electrically heated ovens. This gas thermostat or regulator comprises a chamber 1 adapted to be located in an oven or the like and communicating by means of a flexible tube 2 with a hollow expansible disk 3, the chamber, the tube and the disk being filled with a suitable thermo-responsive fluid. On one side of said expansible disk and in axial alinement therewith is the end of a rod 4 that is slidably mounted in a sectional frame or housing 10. This rod need not be mechanically connected to the expansible disk but lies within the range of expansion thereof so as to be moved axially thereby. This rod carries a fuel supply valve 5 located in the fuel outlet pipe 6, which valve is provided with a coiled spring 7 which tends to keep the valve off of its seat 5a, whereas the expansion of the expansible disk overcomes the spring pressure and closes said valve. In this way, the fuel supply is controlled thermostatically.

According to the present invention, a device for giving an audible and a visible signal is associated with a thermostatic regulator. This device comprises a two-part extensible stem fixed to the expansible disk 3 on the side opposite the rod or stem 4 of the fuel control valve. The inner section 8, that is, the section of the stem which is attached to said disk, is hollow and has an internal thread and the other section 9 has a thread which works therein. This outer or second section of said stem is free to turn in a bore provided therefor in the frame 10 and has a collar 11 which overlaps the end of said frame through which it extends, whereby said end serves as a positioning abutment for the collar 11 on said stem. The outer end of the outer section 9 of said stem is bored or hollowed out to receive a helical spring 13, one end of which bears against the bottom of the bore and the other end bears against the end wall of a hollow cap or sleeve 14 which has an axially slidable but non-rotary connection with said outer section of said stem in the form of a slot-and-pin connection 14a. Rigidly mounted on the inner end of the hollow cap 14 is a bell 12. Mounted on said cap and secured thereto, as by a suitable screw 15, is a knob 16. This knob has a cylindrical circumferential band 17 marked off to form a temperature scale that is calibrated to the thermostat and is disposed in operative relation to a pointer or index 36a. Preferably said knob has an intermediate conical band 18 with numerals corresponding to the temperature scale.

The inner section of the stem is locked against rotary movement by means of a hollow shell 19 secured thereto, said shell having a lateral extension 20 that is perforated or notched in register with a pin 21 which extends through such notch and is fixed to the frame 10. Thus, the inner section 8 of the extensible stem is enabled to move endwise under the influence of the expansible disk but cannot rotate and thereby impose any strain on said disk. Surrounding the inner section of the extensible stem is a helical spring 22, one end of which bears against the bottom of said shell 19 and the other end of which extends into a bore provided therefor in the end of the frame 10 and bears against the bottom of said bore, whereby said spring tends to move the extensible stem, together with the expansion disk attached thereto, toward the valve rod 4.

By this arrangement, the expansible disk may be advanced or retracted bodily by turning the knob in one direction or the reverse, as such turning lengthens or shortens the extensible stem while the position of its collar is fixed permanently by its abutment against the frame member, against which said collar is urged by the helical spring 22. This lengthening and shortening of the extensible stem is directly correlated with the rotary movement of the knob and the temperature scale on said knob is made to conform thereto.

Means, adapted to be set by pressing the knob 16 and the bell carrying supporting cap 14 therefor inwardly along the outer section 9 of the stem against the pressure of the spring 13, are provided for striking the bell to sound an audible signal and for exposing a visible indicator when the temperature reaches a predetermined point. For this purpose, the frame is provided with a bore with a pin or bolt 23 extending therethrough parallel with the axis of the extensible stem. Surrounding this pin is a helical spring 24 which bears at one end against the bottom wall of the bore while the other end of said spring bears against a collar 25 integral with or fixed on said pin and itself bearing against a shoulder 26 on said frame. The inner end of the pin projects beyond said bore and is provided with a groove 27 that forms a reduced neck portion and a head 28 at the end thereof.

In the path of travel of said head portion is a catch or detent 29 with a tooth adapted to enter said groove and engage the head on said pin and thereby lock the pin in opposition to the pressure of the helical spring 24. This detent has an arm that is provided with a tension spring 30 that tends to hold the inclined edge of the detent in line with the head of the pin. The detent is in the form of a three-armed lever whose third arm 31 is in position to cooperate with the edge of one arm of a second lever or trigger 32 whose other arm is in the path of a collar 33 on the valve stem. The arrangement is such that the pressure of said collar moves the trigger 32 against the catch 29 in opposition to the pull of the spring 30 and thereby disengages said catch from the bolt or pin 23.

When the pin 23 is pressed inwardly, its head rides past the spring catch 29 which thereupon engages the back of the head and locks the pin against outward movement under the force of its helical spring 24. The outer end portion of the pin has a notch 34 which is engaged by a flange or projection 35 at the inner end of a slide member or plate 36. This plate slides in a longitudinal groove or slideway provided therefor in a housing member 37 that is fixed to the frame and whose forward end preferably overlaps the rear portion of the knob. The front end of the slide plate 36 extends slightly beyond the forward end of the housing member and is preferably shaped to form the pointer 36a that is disposed in operative relation to the temperature scale on the rotary and axially slidable knob 16. Preferably the outer or pointer end of the slide plate is visible in its retracted position; but said end becomes more conspicuous in its advanced position by reason of a larger portion thereof being then exposed to view. Such exposed portion is preferably given a bright color, such as bright red, to make it more conspicuous.

A bell clapper 38 is pivotally mounted on the forward end of the pin 23 in position to strike the bell when the pin is shot forward by its helical spring 24. In order to prevent the knob from turning too far in either direction, it is provided with a finger or piece 39 that extends rearwardly near its periphery in position to contact with a stop or abutment 40 provided therefor on the inside of the housing.

The operation of the device is as follows: The device is set preferably by turning the knob to bring the predetermined temperature mark on the scale opposite the pointer portion of the slide plate, and the knob, with the bell attached thereto, is pressed in far enough for the spring catch to automatically enter the groove and engage the head of the locking pin or bolt. In this movement, the bell bears against the end of the locking pin and moves it likewise. If desired, the alarm may be set without any endwise pressure on the knob merely by pressing the slide plate inwardly, preferably by means of a finger lug 36b on the exposed end thereof. As the temperature rises and the expansible disk expands, said disk presses the valve stem inwardly and the collar on said valve stem bears against the trigger 32 which, in turn, bears against the spring catch and moves it out of engagement with the spring pin when the oven temperature reaches the point for which the thermostat has been set. Thereupon, said pin is shot forward with a quick snap action by its spring 24, carrying with it the sliding pointer plate and the bell clapper, whereby the clapper strikes the bell and sounds an audible alarm and a considerable portion of the plate is exposed beyond the housing where it remains and is the more conspicuous by reason of its bright color and constitutes a visible indicator.

While the construction hereinbefore described provides both audible and visible signals for indicating when the temperature reaches the point for which the device has been set, it is obvious that one or the other of these signals may be dispensed with. It is noted as an important advantage of our invention that the load or drag of the signaling mechanism on the sensitive thermostatic mechanism is limited to the relatively short period when the temperature has almost reached the point for which the thermostat has been set. This is due to the quick snap action release of the spring closed catch and the relatively small movement required for the thermostatic mechanism to disengage said catch. Thus, the catch disengaging trigger is entirely free of the thermostatic mechanism except when said mechanism nears the end of its valve closing movement. After the trigger is actuated, the spring catch is also disengaged from the spring projected signal operating bolt, thereby relieving said bolt of the frictional drag of the spring catch thereon after the signals are released.

While we have illustrated and described the invention in connection with a thermostat of the kind used for controlling the temperature of a gas heated oven, it is obvious that the invention is equally applicable to thermostats for electrically heated ovens.

Obviously, the hereinbefore described arrangement admits of considerable modification without departing from the invention. Therefore, we do not wish to be limited to the precise arrangement shown and described.

What we claim is:

1. A thermostat comprising a member responsive to variations of temperature, control means adapted to be actuated by said member, means for adjusting said member relative to said control means, said adjusting means including a movable temperature scale and a pointer movable transversely of said scale independently thereof, means for setting said pointer in retracted position, means operable by said member for releasing said pointer setting means at the temperature indicated on said scale by said pointer, and means operable upon the release of said setting means for snapping said pointer to advanced position.

2. A thermostat comprising a member responsive to variations of temperature, control means adapted to be actuated by said member, means for adjusting said member relative to said control means, said adjusting means including a movable temperature scale and a pointer movable transversely thereof, means for setting said pointer in retracted position, means operable by said member for releasing said setting means at the temperature indicated on said scale by said pointer, an audible signal, and means operable upon the release of said setting means for moving said pointer to advanced position and for sounding said audible signal.

3. The combination of a thermostatic system having a member responsive to variations of temperature, control means adapted to be actuated by said member and means for adjusting said member relative to said control means, said adjusting means including a movable temperature scale, a pointer movable transversely thereof, means for setting said pointer in retracted position, means operable by said member for releasing said setting means, means operable upon the release of said setting means for moving said pointer to advanced position, and an audible signal operable by the means which moves the pointer to advanced position, whereby, in the retracted position of said pointer, it indicates on said temperature scale the predetermined temperature for which the device is set and, in its advanced position, indicates that said temperature has been reached.

4. The combination of a thermostatic system having a member responsive to variations of temperature, control means adapted to be actuated by said member and means for adjusting said member relative to said control means, said means including a temperature scale and a pointer therefor, said scale and said pointer being movable relatively to each other lengthwise of said scale to set the device for a predetermined temperature, and an audible signal for indicating that said temperature has been reached, said scale and said pointer being movable relatively to each other crosswise of said scale to set said signal.

5. The combination of a thermostatic system having a member responsive to variations of temperature, control means adapted to be actuated by said member and means for adjusting said member relative to said control means, said means including a temperature scale and a pointer therefor, said scale and said pointer being movable relatively to each other lengthwise of said scale to set the device for a predetermined temperature, and an audible signal for indicating that said temperature has been reached, said scale and said pointer being movable relatively to each other crosswise of said scale to set said signal, and means operable by setting off of said signal for returning said relatively movable parts to their normal position of relative crosswise movement without disturbing the temperature setting.

6. The combination of a thermostatic system having a member responsive to variations of temperature, control means adapted to be actuated by said member and means for adjusting said member relative to said control means, said adjusting means including a rotary and axially slidable knob having a temperature scale thereon and a pointer slidable transversely of said scale, means operable by the axial sliding movement of said knob for setting said pointer in retracted position, means operable by said member for releasing said setting means and moving said pointer to advanced position, and an audible signal operable by the means which moves the pointer to advanced position whereby, in the retracted position of said pointer, it indicates the temperature for which the device is set and, in its advanced position, indicates that said temperature has been reached.

7. The combination of a thermostatic system having an expansible member responsive to variations of temperature, an extensible rod comprising two sections having threaded engagement with each other, one of said sections being attached to said expansible member and the other section having slidably but non-rotatably mounted thereon a knob with an arcuate temperature scale, a bell, a spring arranged to press said knob outwardly, a spring-pressed bolt having the clapper of the bell attached thereto, a pointer engaged with said bolt to move therewith and having its tip portion opposite said scale, a spring detent adapted to releasably engage said spring bolt and a lever in operative relation to said expansible member to be actuated thereby and in operative relation to said spring detent to move said detent in opposition to its spring and thereby disengage said spring bolt.

8. The combination of a thermostatic system having an expansible member responsive to variations of temperature, an extensible rod attached to said expansible member having slidably but non-rotatably mounted thereon a knob with an arcuate temperature scale, a bell, a spring arranged to press said knob outwardly, a spring-pressed bolt having the clapper of the bell attached thereto, a pointer engaged with said bolt to move therewith and having its tip portion opposite said scale, a stationary housing member which covers the main portion of the pointer with a minor portion at the tip end exposed in set position, a spring detent adapted to releasably engage said spring bolt and a lever in operative relation to said expansible member to be actuated thereby and in operative relation to said spring detent to move said detent in opposition to its spring and thereby disengage said spring bolt to cause said clapper to ring said bell and to expose to view a considerable portion of said pointer.

9. The combination of a thermostatic system having an expansible member responsive to variations of temperature, an extensible rod comprising two sections having threaded engagement with each other, one of said sections being attached to said expansible member and the other section having slidably mounted thereon a knob with an arcuate temperature scale, a bell, a spring arranged to press said last mentioned section outwardly, a spring-pressed bolt having the clapper of the bell attached thereto, a pointer engaged with said bolt to move therewith and having its tip portion opposite said scale, a stationary housing member which overlaps the inner end of the knob and the main portion of the pointer with a minor portion at the tip end exposed in set position, a spring detent adapted to releasably engage said spring bolt and a lever in operative relation to said expansible member to be actuated thereby and in operative relation to said spring detent to move said detent in opposition to its spring and thereby disengage said spring bolt to cause said clapper to ring said bell and to expose to view a considerable portion of said pointer.

10. A thermostat comprising an expansible member responsive to variations of temperature, control means adapted to be actuated by said member, means for adjusting said member relative to said control means to set said thermostat for a predetermined temperature, said adjusting means including a rotary and axially slidable knob with an arcuate scale thereon and a spring projected pointer movable transversely of said scale, a bell, a clapper for said bell movable with said pointer, means for setting said pointer and clapper in retracted position by axial movement of said knob, and means operable by said member for releasing said setting means at approximately the temperature indicated on said scale by said pointer, thereby permitting said pointer to move to advanced position and said clapper to engage said bell.

11. A thermostat comprising a member responsive to variations of temperature, control means actuated by said member, and means for adjusting said member relative to said control means to set said thermostat for a predetermined temperature, said adjusting means including a rotary scale and a pointer cooperating therewith for indicating thereon said predetermined temperature, said pointer being mounted for sliding movement lengthwise of the rotary axis of said scale without changing the reading indicated thereon by said pointer, means releasable by said member at said predetermined temperature for holding said pointer at one end of its sliding movement, and means operable upon the release of said pointer holding means for moving said pointer in the other direction of its sliding movement to thereby indicate that said predetermined temperature has been reached.

12. A thermostat comprising a member responsive to variations of temperature, control means actuated by said member, and means for adjusting said member relative to said control means to set said thermostat for a predetermined temperature, said adjusting means including a rotary scale and a pointer cooperating therewith for indicating thereon said predetermined temperature, said pointer being mounted for sliding movement lengthwise of the rotary axis of said scale without changing the reading indicated thereon by said pointer, means releasable by said member at said predetermined temperature for holding said pointer at one end of its sliding movement, means operable upon the release of said pointer holding means for moving said pointer in the other direction of its sliding movement to thereby indicate that said predetermined temperature has been reached, an audible signal, and means operated by the means for moving said pointer in said other direction for sounding said audible signal.

THOMAS T. ARDEN.
GLEN M. CASSIDY.